(12) United States Patent
Li et al.

(10) Patent No.: US 12,182,329 B2
(45) Date of Patent: Dec. 31, 2024

(54) AIRBAG TYPE FORCE FEEDBACK DEVICE AND FORCE FEEDBACK METHOD

(71) Applicant: AAC Acoustic Technologies (Shanghai) Co., Ltd., Shanghai (CN)

(72) Inventors: Yuntong Li, Shanghai (CN); Bing Xie, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/331,119

(22) Filed: Jun. 7, 2023

(65) Prior Publication Data

US 2024/0220021 A1 Jul. 4, 2024

Related U.S. Application Data

(63) Continuation of application No. PCT/CN2023/072719, filed on Jan. 17, 2023.

(30) Foreign Application Priority Data

Dec. 31, 2022 (CN) .......................... 202211735146.1

(51) Int. Cl.
*G06F 3/01* (2006.01)
*G06F 3/02* (2006.01)

(52) U.S. Cl.
CPC ............ *G06F 3/016* (2013.01); *G06F 3/0202* (2013.01)

(58) Field of Classification Search
CPC ............................... G06F 3/016; G06F 3/0202
See application file for complete search history.

(56) References Cited

FOREIGN PATENT DOCUMENTS

CN 201022055 Y * 2/2008 ............. H01H 13/14

* cited by examiner

*Primary Examiner* — Temesghen Ghebretinsae
*Assistant Examiner* — Sosina Abebe
(74) *Attorney, Agent, or Firm* — W&G Law Group (57) ABSTRACT

A force feedback device includes a base, an airbag, a button and an air pump. The base is equipped with an air guide hole penetrating therethrough. The airbag is equipped with an inflation aperture, and the airbag is attached to one side of the base. The button is fixed on one side of the airbag away from the base. The air pump is fixed on one side of the base away from the airbag. An output end of the air pump passes through the air guide hole to be fixedly connected to the airbag, and forms a sealed connection with the airbag via the inflation apertures.

10 Claims, 8 Drawing Sheets

AIRBAG TYPE FORCE FEEDBACK DEVICE AND FORCE FEEDBACK METHOD

TECHNICAL FIELD

The various embodiments described in this document relate in general to a force feedback device, and more specifically to an airbag type force feedback device and a force feedback method.

BACKGROUND

With the development of network technology and electronic information technology, more and more game developments, various joysticks, virtual reality devices, and augmented reality devices are developing, and users have increasingly high sensory requirements when using peripherals.

At present, the triggers on various controllers or peripherals cannot be adjusted according to different game scenarios, and some only provide certain vibration feedback, which is difficult to provide users with a good game experience and cannot provide users with an immersive game experience. As an important feature of haptic feedback, force feedback has been paid more and more attention with the development of different electronic devices, especially the evolution of personal consumer electronics.

However, force feedback in related technologies achieves certain force effects merely through springs, vibration motors, and gear motors, which are relatively single. Moreover, the force generated by direct motor drive or motor plus gear group drive is not smooth enough, such as the jerking caused by the cogging torque of the motor and the clearance of gears and other structures, which is difficult to achieve precise force feedback. At the same time, the mechanism is generally complex, with many parts and large dimensions, and cannot adapt well to various spaces.

SUMMARY

In some embodiments, a force feedback device includes
 a base, equipped with an air guide hole penetrating therethrough;
 an airbag, equipped with an inflation aperture, the airbag being attached to one side of the base;
 a button, fixed on one side of the airbag away from the base; and
 an air pump, fixed on one side of the base away from the airbag, an output end of the air pump passing through the air guide hole to be fixedly connected to the airbag, and forming a sealed connection with the airbag via the inflation apertures.

In some embodiments, the force feedback device further includes a guide component located between the base and the button, the guide component being connected to the base and the button, the button forming a rotating or sliding connection with the guide component.

In some embodiments, the guide component includes multiple guide tubes fixed on one side of the base adjacent to the button, and multiple guide posts fixed on one side of the button adjacent to the base, each of the guide posts being inserted into one of the guide tubes to form a sliding pair; the guide tubes being arranged around the airbag, and forming a guide space to control the expansion direction of the airbag together with the base and button.

In some embodiments, the airbag includes a core airbag with the inflation aperture and at least one auxiliary airbag, the volume of the core airbag is larger than that of the auxiliary airbag, and a valve structure is set between the air pump and each of the core airbag and the auxiliary airbag to control the conduction or closure of the air pump and each of the core airbag and the auxiliary airbag.

In some embodiments, the airbag includes a core airbag and at least one auxiliary airbag, the volume of the core airbag is larger than that of the auxiliary airbag, the surfaces of the core airbag and the auxiliary airbag are both equipped with inflation apertures, and the core airbag and the auxiliary airbag are sealed and connected to the output end of the air pump via different air guide holes.

In some embodiments, the airbag is plural, each airbag surface is provided with an inflation aperture, and each airbag forms a sealed communication with the output end of the air pump via different air guide holes.

In some embodiments, the airbag includes an elastic part made of elastic material, a rigid part extending from the elastic part towards the button, and the rigid part is fixedly connected to the button.

In some embodiments, the airbag includes an elastic part made of elastic material, a first rigid part and a second rigid part extending from both sides of the elastic part, the first rigid part serves as the button, and the second rigid part serves as the base and is connected to the air pump.

In some embodiments, the airbag is an integrally formed structure.

In some embodiments, a force feedback method, which is implemented based on the force feedback device of any one of above embodiments, includes the following steps:
 S1. driving the air pump to generate airflow and transmit the airflow to the airbag through the air guide hole;
 S2. making the airbag inflate and expand, feeding back the force generated by the expansion to the button connected to the airbag;
 S3. obtaining the feedback force of the button being pressed by external force and causing the airbag to deform; and
 S4. adjusting the size of the airflow generated by the air pump based on the feedback force.

BRIEF DESCRIPTION OF THE DRAWINGS

The present embodiments are illustrated by way of example and not limitation in the figures of the accompanying drawings, in which like references may indicate similar elements.

DETAILED DESCRIPTION OF THE EMBODIMENTS

The following will provide a clear and complete description of the technical solution in the embodiments of the present invention in conjunction with the accompanying drawings. Obviously, the described embodiments are only a part of the embodiments of the present invention, but not all of them. Based on the embodiments in the present invention, all other embodiments obtained by ordinary technicians in the art without creative labor fall within the scope of protection of the present invention.

Example 1

Please refer to FIGS. 1-4. The embodiment of the present invention provides a force feedback device 100, including: a base 1, an airbag 2, a button 3, and an air pump 4.

The base 1 is equipped with an air guide hole 11 penetrating therethrough. A surface of the airbag 2 is equipped with an inflation aperture 21, and the airbag 2 is attached to one side of the base 1. The button 3 is fixed on one side of the airbag 2 away from the base 1. The air pump 4 is fixed on one side of the base 1 away from the airbag 2. An output end 41 of the air pump 4 passes through the air guide hole 11 so as to be fixedly connected to the air bag 2, and forms a sealed connection with the air bag 2 via the inflation aperture 21.

In some embodiments, the force feedback device 100 further includes a guide component located between the base 1 and the button 3, and connected to the base 1 and the button 3, wherein the button 3 forms a rotating or sliding connection with the guide component.

The guide component includes multiple guide tubes 12 fixed on one side of the base 1 adjacent to the button 3, and multiple guide posts 31 fixed on one side of the button 3 adjacent to the base 1. Each guide post 31 is inserted into one of the guide tubes 12 to form a sliding pair. The guide tubes 12 are arranged around the airbag 2, and form a guide space to control the expansion direction of the airbag 2 together with the base 1 and the button 3.

Specifically, a guiding structure extending along the central axis of the guiding post 31 is formed between the guide tube 12 and the guiding post 31. When the airbag 2 is inflated with air, if not limited by external forces, its expansion direction will appear divergent. In some embodiments, when equipped with the guide tube 12 and the guiding post 31, the expansion direction of the airbag 2 will be controlled. Due to that the guide tube 12 and the guiding post 31 forbid the airbag 2 from expanding towards direction except that toward the buttons 3, the button 3 will be subjected to the force generated by airbag 2. However, due to the continuous inflation of airbag 2, the position of button 3 relative to base 1 will also show continuity, thereby improving the experience of force feedback.

It should be noted that in different scenarios, the directions of the guide tube 12 and the guide posts 31 can be set according to actual needs, and since that the guide tube 12 and the guide posts 31 have no fixing function on the body of the airbag 2, the button 3 can also achieve rotational movement by rotational connection when then airbag 2 expands.

Example 2

In some embodiments, the airbag 2 includes a core airbag and at least one auxiliary airbag, and the volume of the core airbag is larger than that of the auxiliary airbag. The surface of the core airbag and the surface of the auxiliary airbag are both equipped with inflation apertures, and the core airbag and the auxiliary airbag are sealed and connected to the output end 41 of the air pump 4 via different air guide holes 11.

Example 3

In some embodiments, the air bag 2 is plural, each of which is equipped with an inflation aperture on its surface, and each of the air bags 2 forms a sealed communication with the output end 41 of the air pump 4 via different air guide holes 11. In a further embodiment, a valve structure is set between each airbag 2 and the air pump 4 to control the conduction or closure of each of the airbags 2 and the air pump 4.

Figure 1:
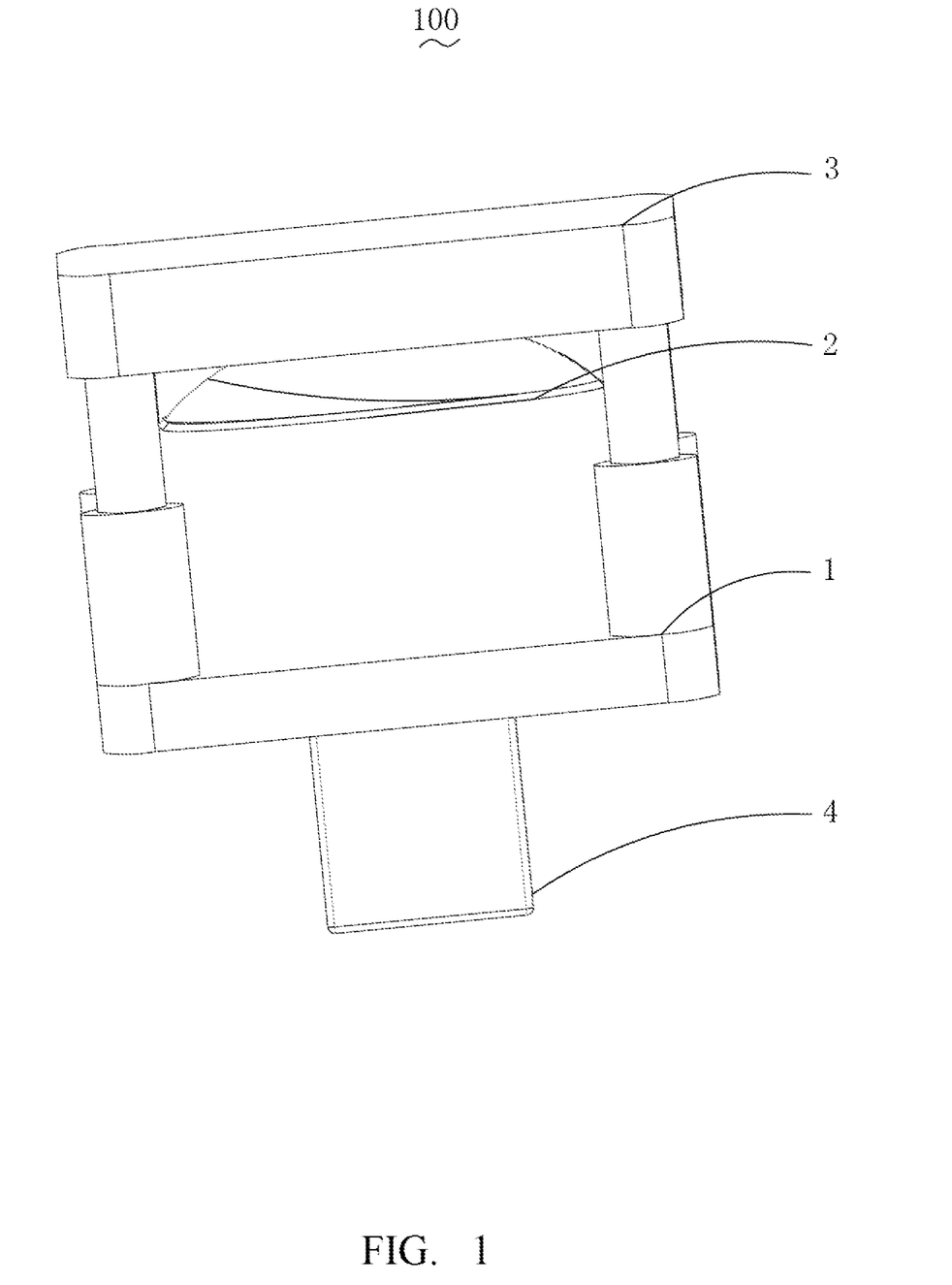
FIG. 1 is a schematic diagram of the three-dimensional structure of the force feedback device in accordance with some embodiments.
Figure 2:
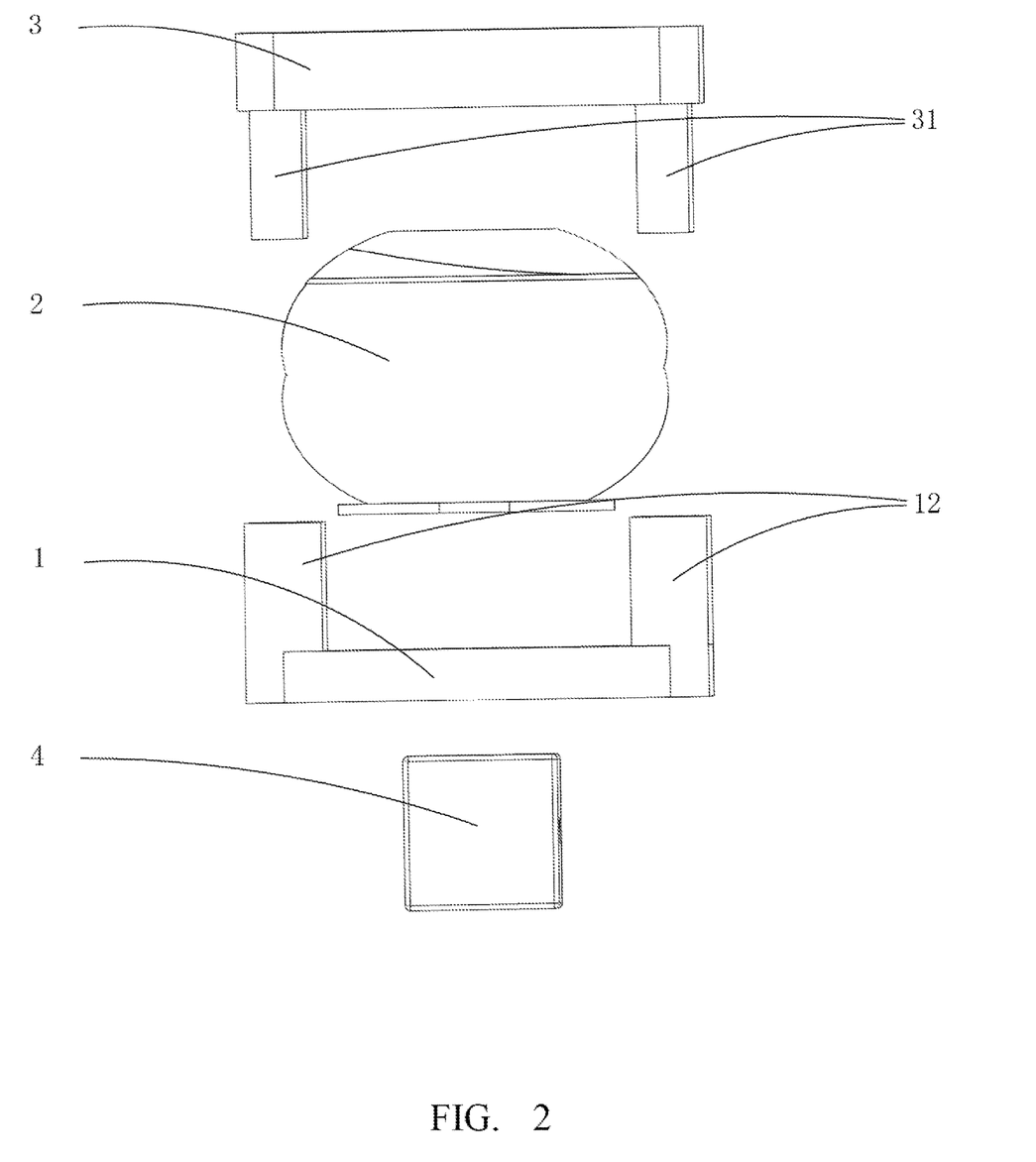
FIG. 2 is a schematic diagram of the decomposition structure of the force feedback device in FIG. 1.
Figure 3:
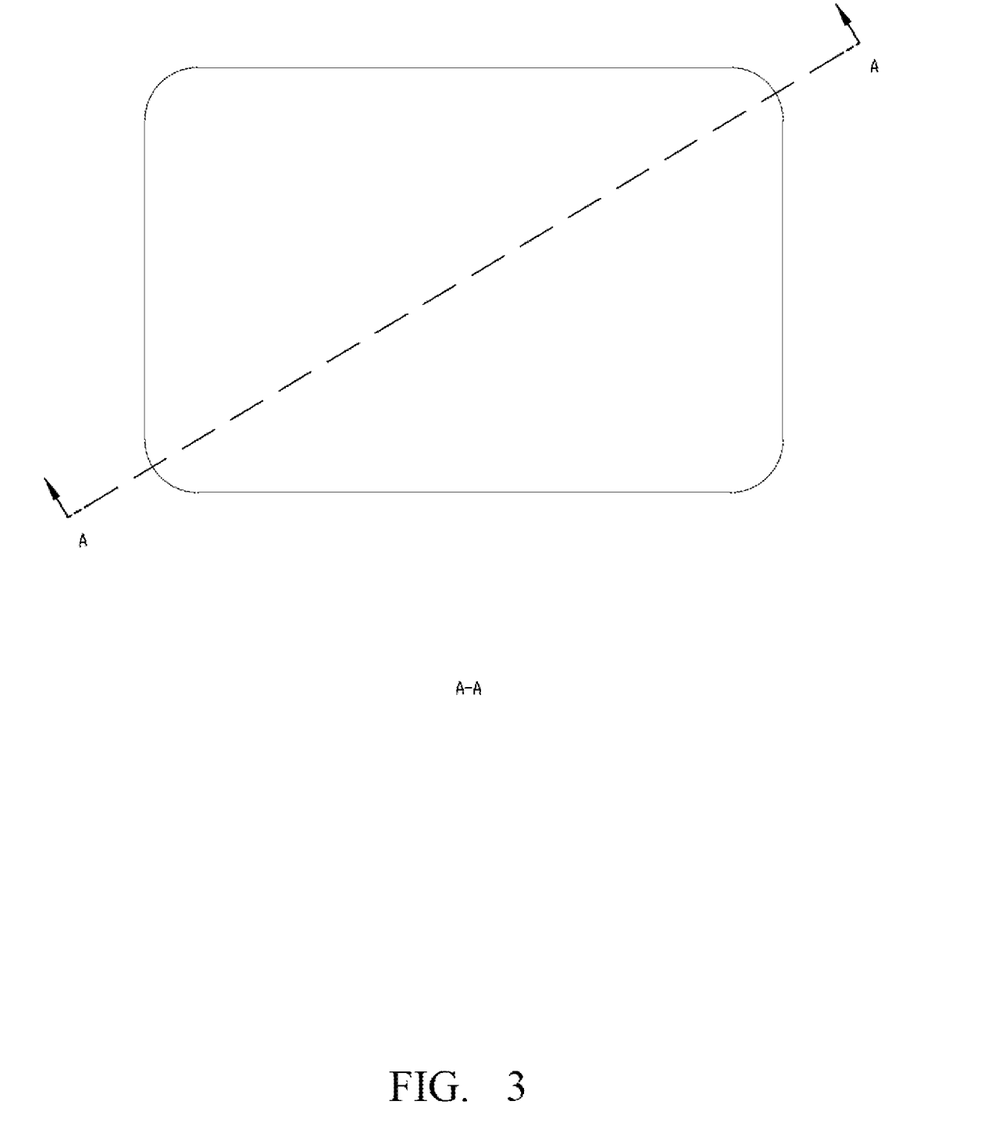
FIG. 3 is a top view of the force feedback device in FIG. 1.
Figure 4:
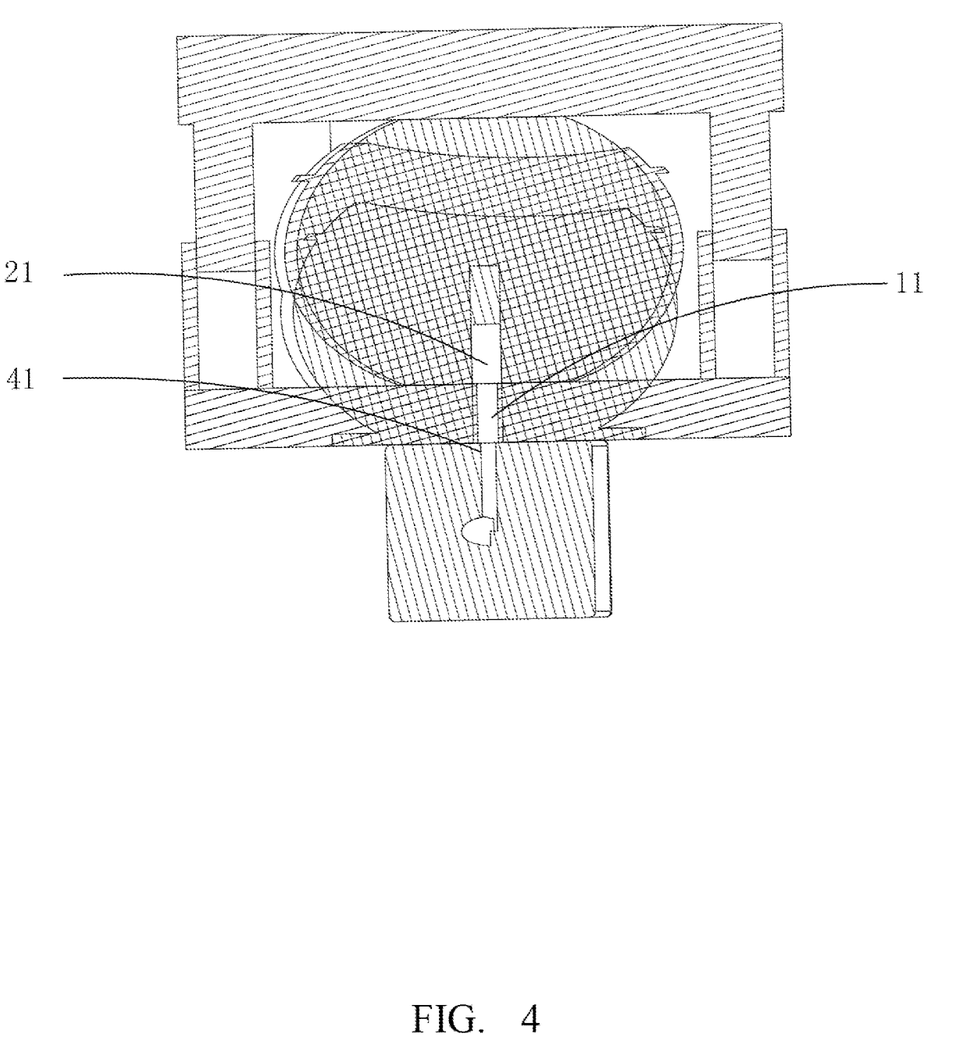
FIG. 4 is a cross-sectional view along the A-A line in FIG. 3.
Figure 5:
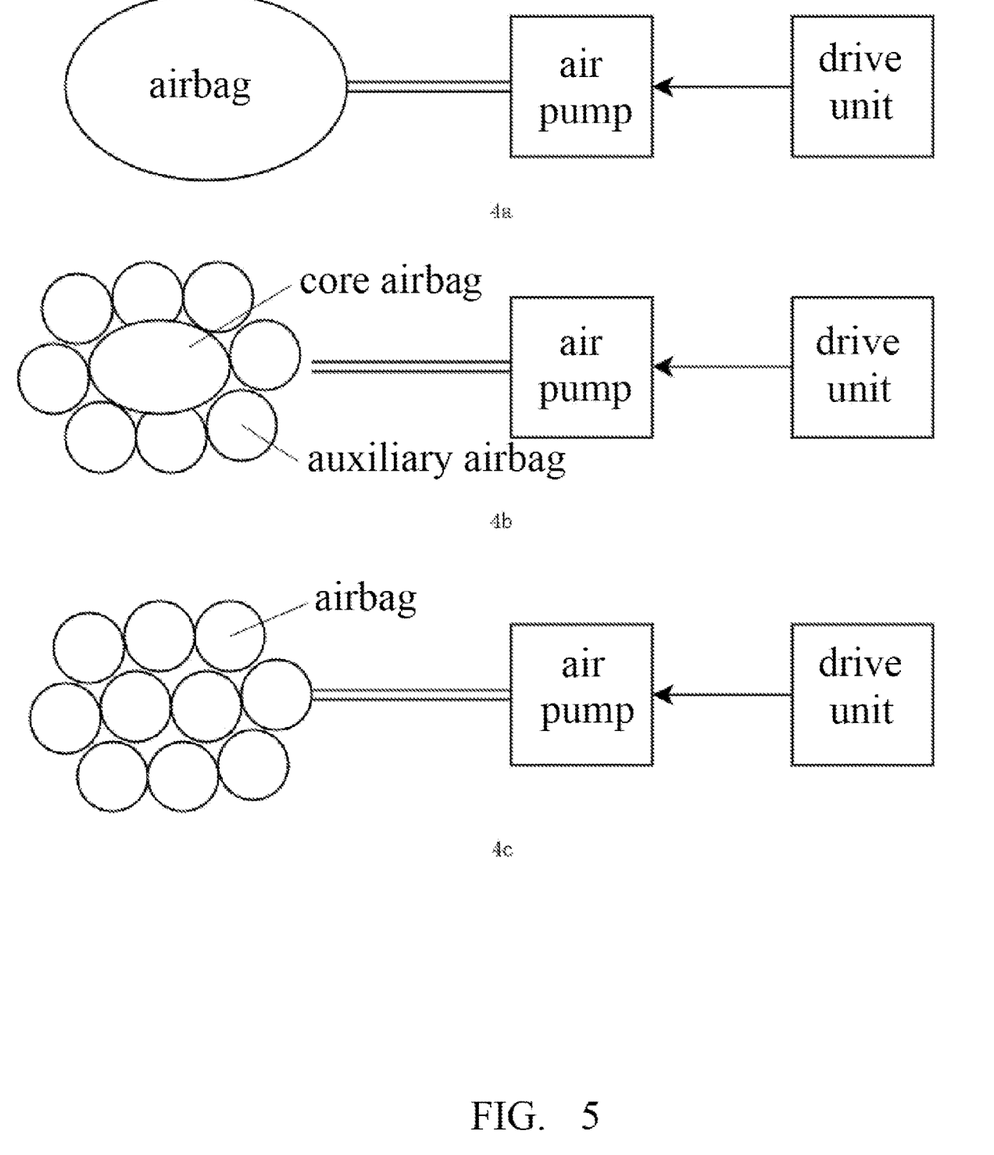
FIG. 5 is a schematic diagram of the airbag structure in accordance with some embodiments.

For example, please refer to FIG. 5, which is a schematic diagram of the airbag structure in accordance with some embodiments. The different airbag implementation methods in Example 1, Example 2, and Example 3 are shown in FIGS. 4a, 4b, and 4c, respectively. For the force description of the single airbag in Example 4a, please refer to above description of Example 1.

In Example 2, the airbag 2 includes a core airbag and at least one auxiliary airbag, and the volume of the core airbag is larger than that of the auxiliary airbag. In practical implementation, the auxiliary airbag can be set as the protrusion of the core airbag. During the inflation process of the core airbag, the protrusion degree of the auxiliary airbag will also vary depending on its position. For example, in case of that the auxiliary airbag is set closer to the position of the button 3, when both the core airbag and the auxiliary airbag expand, the button 3 will be subjected to two directions of force from the core airbag and the auxiliary airbag respectively. Through this design, it is possible to further refine the force feedback magnitude and direction of the airbag 2 on the button 3.

In Example 3, the airbag 2 includes multiple airbag structures with the same size, each of which is equipped with inflation apertures. The air pump 4 inflates the airbag 2 via different air guide holes 11, thereby achieving more force control of the airbag 2 towards the button 3 in different directions.

Example 4

Figure 6:
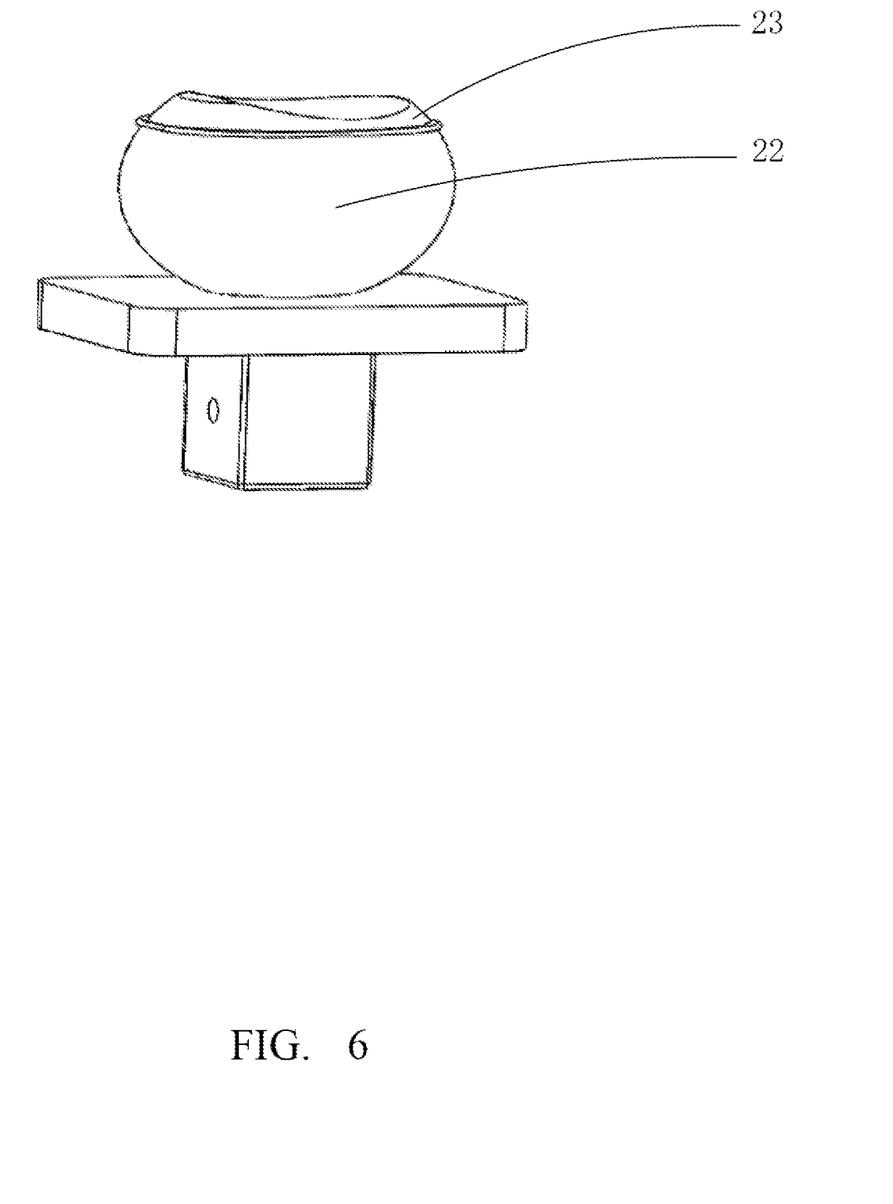
FIG. 6 is a structural schematic diagram of another force feedback device in accordance with some embodiments.

Please refer to FIG. 6, which is a structural schematic diagram of another force feedback device in accordance with some embodiments. What's different from Example 1 is that, the airbag 2 includes an elastic part 22 and a rigid part 23 extending from the elastic part 22 towards the button 3. The rigid part 23 is fixedly connected to the button 3.

Specifically, in order to achieve expansion, the airbag 2 should be made of elastic plastic materials. In some embodiments, in order to optimize the overall structure of the force feedback device 100, a composite material containing elastic and rigid materials can be used as the implementation material of the airbag 2. The rigid part 23 at the junction of the airbag 2 and the button 3 is made of rigid material, allowing the button 3 to directly adhere to the airbag 2 through cured materials, thereby reducing the volume of the button 3. Alternatively, through an integrated design, the rigid part 23 can be manufactured into the shape of the button 3, where the rigid part 23 is integrally formed with the button 3. The rigid material itself can also serve as a component for direct feedback and receiving external forces.

Example 5

Figure 7:
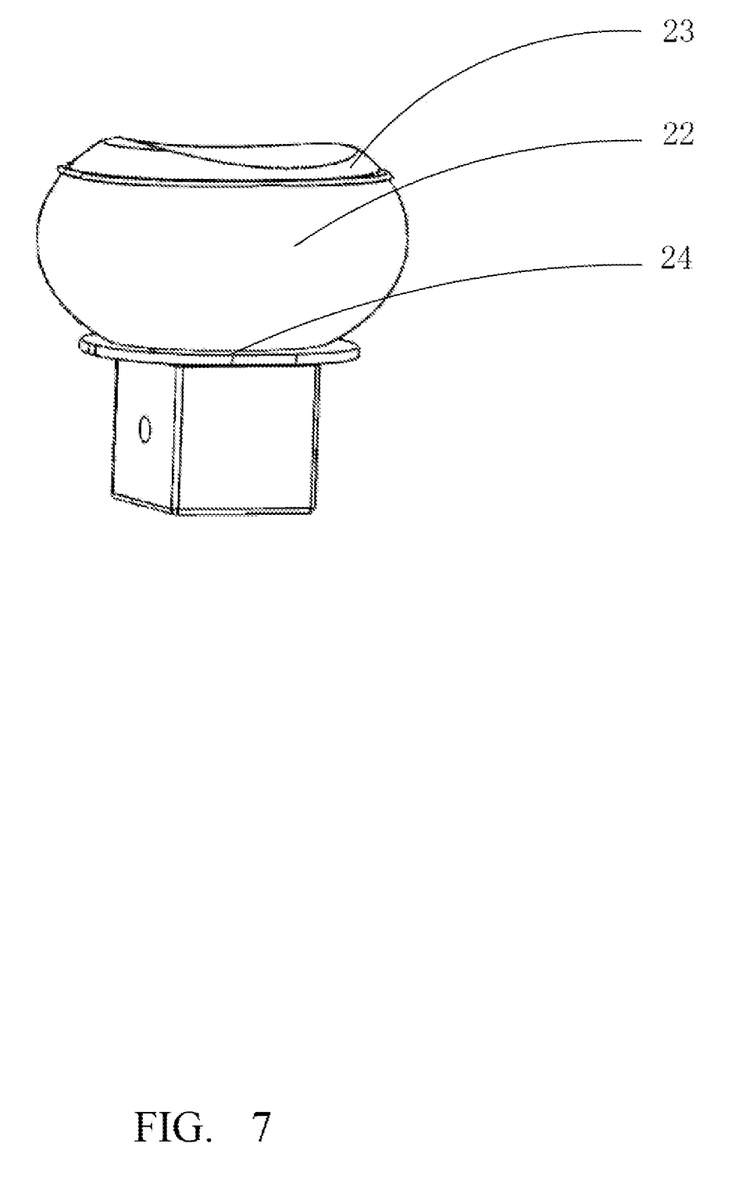
FIG. 7 is a structural schematic diagram of still another force feedback device in accordance with some embodiments.

Please refer to FIG. 7, which is a structural schematic diagram of still another force feedback device in accordance with some embodiments. What's different from Example 4 is that, the airbag 2 includes an elastic part 22 made of elastic material, a first rigid part 23 and a second rigid part 24 extending from both sides of the elastic part 22. The first rigid part 23 serves as the button 3, and the second rigid part 24 serves as a base and is connected to the air pump 4.

In some embodiments, the first rigid part 23 is manufactured into the shape of the button 3 through an integrated molding design. That is, the first rigid part 23 is integrally formed with the button 3, and the rigid material itself can also serve as a component for direct feedback and receiving external forces. The design of base 1 takes into account the button type structure, and the solid structure is more beneficial to the implementation of the air guide hole 11. In the case where the air bag 2 is integrally formed using rigid and elastic materials, the second rigid part 24 can directly serve as the structure of the base 1 between the air bag 2 and the air pump 4, and a communication is achieved through the air guide hole configured on the second rigid part 24, further saving the space occupied by the base 1.

On this basis, the airbag 2 can be an integrally formed structure as a whole. During the integral forming process, airbag 2 are retained to partly formed by elastic materials, which can ensure the expandability of the airbag 2.

It should be noted that in Examples 4 and 5, due to the use of rigid materials and integral molding technology, the structure of the button 3 or the base 1 in Example 1 was omitted, resulting in the omission of the structure of the guide tube 12 and the guide post 31. In order to ensure that the force direction of the buttons in the force feedback device is still controllable, in the actual implementation process, the space configuration of the force feedback device should have the effect of limiting the expansion direction of airbag 2, by means such as setting isolation pieces around the airbag 2.

Example 6

Figure 8:
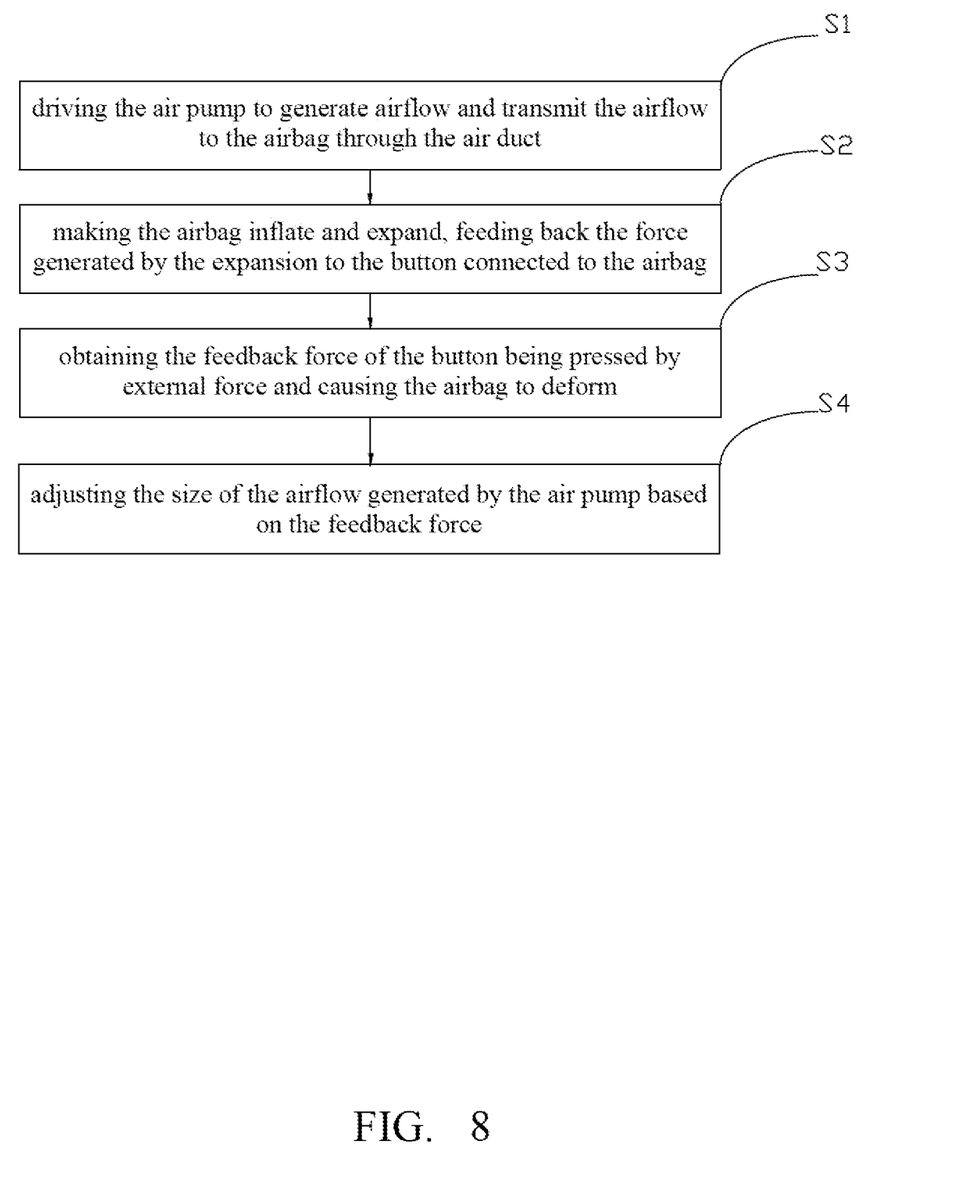
FIG. 8 is a flow diagram of the force feedback method in accordance with some embodiments.

The embodiment of the present invention also provides a force feedback method, please refer to FIG. 8. FIG. 8 is a flow diagram of the force feedback method in accordance with some embodiments. The force feedback method is based on the force feedback device described in any of the above embodiments, and the force feedback method includes the following steps:

S1. driving the air pump to generate airflow and transmit the airflow to the airbag through the air guide hole;

S2. making the airbag inflate and expand, feeding back the force generated by the expansion to the button connected to the airbag;

S3. obtaining the feedback force of the button being pressed by external force and causing the airbag to deform;

S4. adjusting the size of the airflow generated by the air pump based on the feedback force.

Compared with related technologies, in the force feedback device of the present invention, due to that the device is equipped with a base, the base is equipped with a guide hole penetrating therethrough; an airbag is equipped with an inflation aperture, the airbag is attached to one side of the base; a button is fixed to the side of the airbag away from the base; an air pump is fixed on the side of the base away from the airbag; and the output end of the air pump passes through the air guide hole to be fixedly connected to the airbag, and forms a sealed connection with the airbag via the inflation aperture, different forces can be generated in different directions by controlling the internal gas of the airbag and the guiding structure, and force feedback can be more finely controlled by controlling the airbag volume. At the same time, the force generated by the change of the airbag volume is more continuous. The force feedback device of the present invention achieves smoother force feedback and better experience compared to devices such as gears.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A force feedback device, comprising:
   a base, equipped with an air guide hole penetrating therethrough;
   an airbag, equipped with an inflation aperture, the airbag being attached to one side of the base;
   a button, fixed on one side of the airbag away from the base; and
   an air pump, fixed on one side of the base away from the airbag, an output end of the air pump passing through the air guide hole to be fixedly connected to the airbag, and forming a sealed connection with the airbag via the inflation apertures;
   the airbag is plural, each airbag surface is provided with an inflation aperture, and each airbag forms a sealed communication with the output end of the air pump via different air guide holes.

2. The force feedback device of claim 1, wherein the force feedback device further comprises a guide component located between the base and the button, the guide component being connected to the base and the button, the button forming a rotating or sliding connection with the guide component.

3. The force feedback device of claim 2, wherein the guide component comprises multiple guide tubes fixed on one side of the base adjacent to the button, and multiple guide posts fixed on one side of the button adjacent to the base, each of the guide posts being inserted into one of the guide tubes to form a sliding pair; the guide tubes being arranged around the airbag, and forming a guide space to control the expansion direction of the airbag together with the base and button.

4. The force feedback device of claim 1, wherein the airbag comprises a core airbag with the inflation aperture and at least one auxiliary airbag, the volume of the core airbag is larger than that of the auxiliary airbag, and a valve structure is set between the air pump and each of the core airbag and the auxiliary airbag to control the conduction or closure of the air pump and each of the core airbag and the auxiliary airbag.

5. The force feedback device of claim 1, wherein the airbag comprises a core airbag and at least one auxiliary airbag, the volume of the core airbag is larger than that of the auxiliary airbag, the surfaces of the core airbag and the auxiliary airbag are both equipped with inflation apertures, and the core airbag and the auxiliary airbag are sealed and connected to the output end of the air pump via different air guide holes.

6. The force feedback device of claim 1, wherein the airbag comprises an elastic part made of elastic material, a rigid part extending from the elastic part towards the button, and the rigid part is fixedly connected to the button.

7. The force feedback device of claim 1, wherein the airbag comprises an elastic part made of elastic material, a first rigid part and a second rigid part extending from both sides of the elastic part, the first rigid part serves as the button, and the second rigid part serves as the base and is connected to the air pump.

8. The force feedback device of claim 6, wherein the airbag is an integrally formed structure.

9. The force feedback device of claim 7, wherein the airbag is an integrally formed structure.

10. A force feedback method, wherein the force feedback method is implemented based on the force feedback device of claim 1, comprising:
- S1. driving the air pump to generate airflow and transmit the airflow to the airbag through the air guide hole;
- S2. making the airbag inflate and expand, feeding back the force generated by the expansion to the button connected to the airbag;
- S3. obtaining the feedback force of the button being pressed by external force and causing the airbag to deform; and
- S4. adjusting the size of the airflow generated by the air pump based on the feedback force.

\* \* \* \* \*